July 16, 1946.  H. W. KOST  2,404,236
SHEET METAL FASTENING DEVICE
Filed June 23, 1945
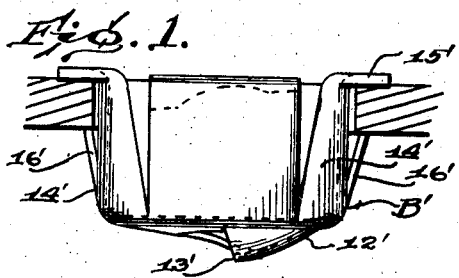
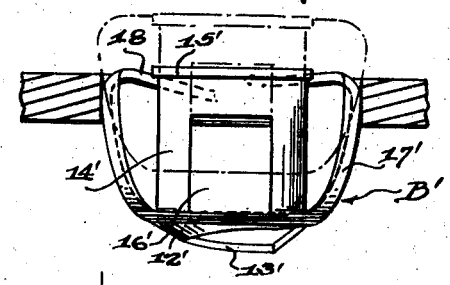
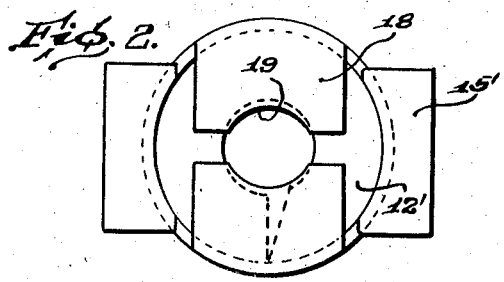
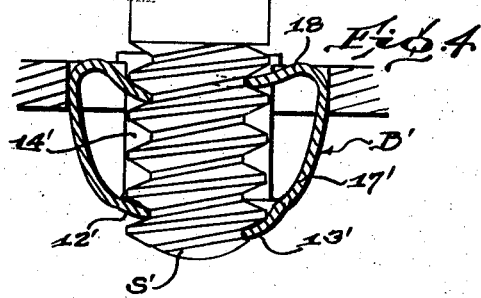
INVENTOR.
Harold W. Kost
BY
ATTORNEY Patented July 16, 1946

2,404,236

UNITED STATES PATENT OFFICE 2,404,236

SHEET METAL FASTENING DEVICE

Harold W. Kost, Birmingham, Mich., assignor to Detroit Harvester Company, Detroit, Mich., a corporation of Michigan Original application September 1, 1944, Serial No. 552,257. Divided and this application June 23, 1945, Serial No. 601,254

3 Claims. (Cl. 85—36)

This invention relates to fasteners, but more particularly to sheet metal fasteners adapted to receive screw-threaded members, and an object is to produce a fastener of this character which has snap engagement in an aperture of a supporting panel and has a plurality of screw-threaded engaging devices to cooperate with each other securely to retain the screw in place.

Another object is to produce a new and improved fastener of spring metal which is adapted to be readily applied in position of use and is formed with integral screw-thread engaging means and also lock nut means for militating against the screw coming loose due to jars, shocks or vibrations.

Other objects and advantages will hereinafter appear, and for purposes of illustration but not of limitation, embodiments of the invention are shown in the accompanying drawing in which Figure 1 is a side elevation partly in section of a sheet metal fastener adapted for snap engagement within the aperture of a supporting panel and is provided with screw-thread engaging means and also lock nut means;

Figure 2 is a top plan view of the fastener shown on Figure 1;

Figure 3 is a side elevation of the fastener shown on Figure 1 viewing another side and showing the screw-thread engaging fingers; and Figure 4 is a vertical sectional view of the fastener shown on Figures 1 to 3 with the screw applied thereto.

The illustrated embodiment of the invention comprises a sheet metal fastener provided with a cup-shaped body B' provided with a bottom wall 12'. Integrally formed in the bottom wall 12' is a nut-like screw thread engaging part 13'. Tongues 14' extend upwardly from the bottom wall 12' and terminate in outwardly bent flanges 15'. Struck from the side walls of the tongues 14' are integral outwardly inclined fingers 16' which are substantially rectangular and curvilinear in cross section to conform to the aperture in the supporting panel. The free end of each finger 16' is spaced from the adjacent flange 15' a distance approximately equal to the thickness of the supporting panel thereby to impinge against the under side of the panel and cooperate with the flange 15' in holding the fastener in position. Manifestly this provides for snap fastening engagement with the panel aperture.

As shown particularly on Figure 4, a pair of spaced tongues or arms 17' are integral with the base or bottom wall 12' and are interposed between the tongues 14'. Each of the tongues 17' inclines upwardly and outwardly from the bottom wall 12' so that when the fastener is mounted within the panel aperture, the upper portions of the tongue engage the wall of the aperture as shown. The outer end portion 18 of each tongue 17' is bent inwardly into the path of the screw, the free ends being spaced axially from each other in accordance with the pitch of the screw threads. As shown, each end portion 18 is formed with a curvilinear notch 19 in order effectively to contact the root diameter of the screw.

When a screw S' (Figure 4) is inserted in the fastener, it first engages the end portions 18 screw-threadedly and then the nut portion 13'. Upon tightening the screw, the nut portion 13' is deformed to grip tightly the root diameter of the screw and the end portions 18 also tighten upon the screw, effecting a toggle-like action forcing the tongues 17' into intimate binding contact with the wall of the panel aperture. Thus the screw S' is engaged at two regions and a lock nut effect secured, thereby militating against the screw or fastener S' coming loose.

This application constitutes a division of my co-pending application Serial No. 552,257, filed September 1, 1944, entitled "Sheet metal fastener."

It is to be understood that numerous changes in details of construction, arrangement and operation may be effected without departing from the spirit of the invention especially as defined in the appended claims.

What I claim is:

1. A fastener comprising a cup-shaped body of spring metal adapted to be inserted into an aperture in a supporting panel, an integral screw thread engaging portion deformed from the bottom wall of the body and spaced inwardly from the inner side of the supporting panel, said body including two pairs of opposed integral tongues extending in the same general direction from the bottom wall, outwardly bent flanges on one pair of tongues to engage the outer side of the supporting panel, the other pair of tongues being engageable with the walls of the panel aperture, and end portions on said last tongues extending inwardly toward each other for engagement with the threads of a screw.

2. A fastener comprising a cup-shaped body of spring metal adapted to be inserted into an aperture in a supporting panel, an integral screw thread engaging portion deformed from the bottom wall of the body and spaced inwardly from the inner side of the supporting panel, said body including two pairs of opposed integral tongues extending in the same general direction from the bottom wall, outwardly bent flanges on one pair of tongues to engage the outer side of the supporting panel, the other pair of tongues being engageable with the walls of the panel aperture, inwardly bent end portions on said latter pair of tongues, and notched ends on said latter tongues for engaging the thread of a screw and to cooperate with said thread engaging portion for securely retaining the screw.

3. A fastener comprising a cup-shaped body of spring metal adapted to be inserted into an aperture in a supporting panel, an integral screw thread engaging portion deformed from the bottom wall of the body and spaced inwardly from the inner side of the supporting panel, said body including two pairs of opposed integral tongues extending in the same general direction from the bottom wall, outwardly bent flanges on one pair of tongues to engage the outer side of the supporting panel, spring fingers integral with said last tongues for snap engagement with the under side of the supporting panel, the other pair of tongues being engageable with the walls of the panel aperture, end portions of said last tongues being bent toward each other, and screw thread engaging surfaces on said bent end portions for cooperating with said thread engaging portion for retaining the screw.

HAROLD W. KOST.